United States Patent [19]

Yonezawa et al.

[11] Patent Number: 4,770,511

[45] Date of Patent: Sep. 13, 1988

[54] ZOOM LENS CAPABLE OF ACCOMPLISHING MACRO-PHOTOGRAPHY

[75] Inventors: Yasuo Yonezawa; Yasuhiro Aono, both of Kawasaki; Tomowaki Takahashi, Tokyo, all of Japan

[73] Assignee: Nippon Kogaku K. K., Tokyo, Japan

[21] Appl. No.: 741,276

[22] Filed: Jun. 3, 1985

[30] Foreign Application Priority Data

Jun. 18, 1984 [JP] Japan ................................. 59-124718

[51] Int. Cl.$^4$ ............................................ G02B 15/22
[52] U.S. Cl. ...................................... 350/428; 350/427
[58] Field of Search ........................ 350/423, 427, 428

[56] References Cited

U.S. PATENT DOCUMENTS 4,492,437  1/1985  Masumoto et al. ................. 350/428
4,634,236  1/1987  Masumoto ....................... 350/428 X Primary Examiner—John K. Corbin
Assistant Examiner—Scott J. Sugarman
Attorney, Agent, or Firm—Shapiro and Shapiro

[57] ABSTRACT

A zoom lens has, in succession from the object side, a first lens group of positive refractive power, a second lens group of negative refractive power, a third lens group of positive refractive power and a fourth lens group of positive refractive power. The first lens group, the third lens group and the fourth lens group are movable toward the object side for a magnification change from the wide angle end to the telephoto end. The focusing up to a short distance object is made possible by moving the second lens group along the optic axis from the position of its telephoto end toward the object side and moving the third lens group along the optic axis from the position of its telephoto end. The zoom lens satisfies the following condition:

$$-0.5 < \chi 3/\chi 2 < 0.5,$$

where $\chi 2$ is the amount of movement of the second lens group from the telephoto end toward the object side for short distance focusing and $\chi 3$ is the amount of movement of the third lens group from the telephoto end toward the object side for short distance focusing.

7 Claims, 8 Drawing Sheets

ZOOM LENS CAPABLE OF ACCOMPLISHING MACRO-PHOTOGRAPHY

BACKGROUND OF THE INVENTION

1. Field of the Invention

This invention relates to a zoom lens capable of accomplishing macro-photography.

2. Description of the Prior Art

Numerous zoom lenses including a wide angle of view and having a relatively wide magnification change area have recently been proposed, but most of them have been long in the shortest photographing distance as compared with single focal length objective lenses having the same degree of focal length, and the shortest photographing distance and the maximum photographing magnification have still been insufficient in such zoom lenses. In order to overcome this disadvantage, use has been made of a method of shortening the photographing distance by moving the lens groups along the optic axis other than the lens group moved from the ordinary focusing, that is, the so-called macro-photography system. However, in the conventional macro-photography system, the shorter the photographing distance, the more substantial the occurrence of aberrations and therefore, in macro-photography, the imaging performance is deteriorated and however excellent in the imaging performance in the infinity photographing stage, it has been difficult to maintain the good performance in a short distance as well.

SUMMARY OF THE INVENTION

It is an object of the present invention to provide a zoom lens which is capable of accomplishing photographing up to a very short distance and moreover can maintain an excellent imaging performance even in macro-photography.

To achieve the above object, the zoom lens capable of accomplishing macro-photography according to the present invention has, in succession from the object side, a first lens group of positive refractive power, a second lens group of negative refractive power, a third lens group of positive refractive power and a fourth lens group of positive refractive power, the first lens group, the third lens group and the fourth lens group being movable toward the object side for a magnification change from the wide angle end to the telephoto end, and in such zoom lens, the focusing up to a short distance object is made possible by moving the second lens group along the optic axis from the position of its telephoto end toward the object side and moving the third lens group along the optic axis from the position of its telephoto end and the following condition is satisfied:

$$-0.5 < \chi_3/\chi_2 < 0.5,$$

where $\chi_2$ is the amount of movement of the second lens group from the telephoto end toward the object side for short distance focusing and $\chi_3$ is the amount of movement of the third lens group from the telephoto end toward the object side for short distance focusing.

DESCRIPTION OF THE PREFERRED EMBODIMENTS

Figure 1A:
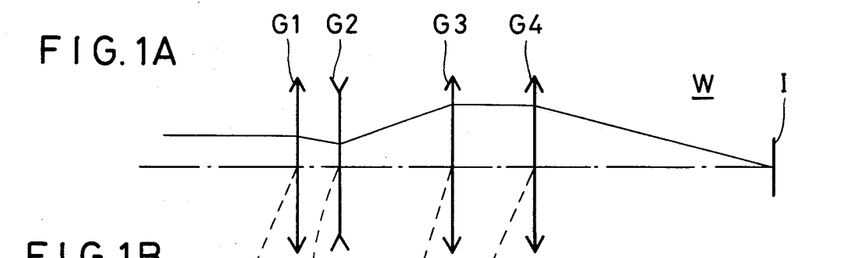
FIGS. 1A, 1B and 1C are basic construction views showing the construction of the zoom lens according to the present invention and the construction for macro-photography.
Figure 1B:
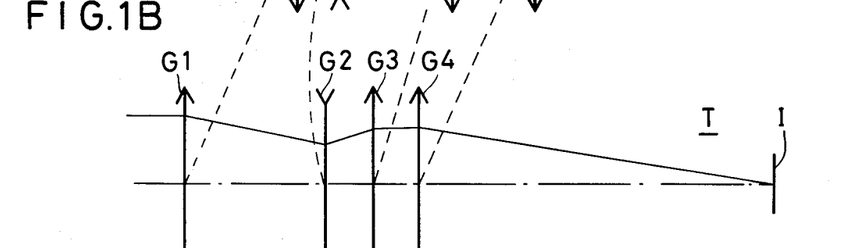
Figure 1C:
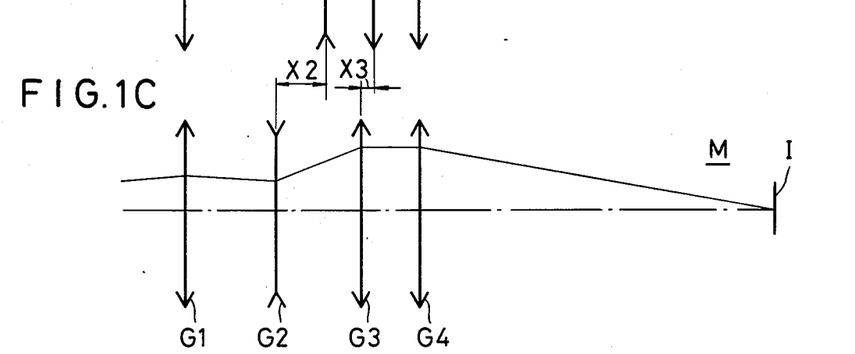

FIG. 1A shows the arrangement of lens groups at the wide angle end, FIG. 1B shows the arrangement of lens groups at the telephoto end, and FIG. 1C shows the arrangement of lens groups in the macro-photography state from the telephoto end. In these Figures, broken lines indicate an example of the movement path of each group for magnification change, and I designates the image plane. As shown, the zoom lens of the present invention has, in succession from the object side, a first lens group G1 of positive refractive power, a second lens group G2 of negative refractive power, a third lens group G3 of positive refractive power and a fourth lens group G4 of positive refractive power. To accomplish macro-photography, with the position of each group at the telephoto end of the zoom lens as the reference, the second lens group G2 is moved toward the object side and the third lens group G3 is moved toward the object side or the image side depending on the aberration fluctuation caused by the movement of the second lens group G2, and when the amount of movement of the second lens group G2 toward the object side is $\chi_2$ and the amount of movement of the third lens group G3 toward the object side is $\chi_3$, $-0.5 < \chi_3/\chi_2 < 0.5$ is satisfied. Accordingly, the negative value in the above formula means that the third lens group G3 is moved toward the image side.

In the zoom lens of the present invention as described above, the second lens group G2 of negative refractive power at the telephoto end is moved toward the object side to thereby shorten the photographing distance and enable macro-photography to be accomplished, but as the second lens group G2 is moved more toward the object side, that is, as the second lens group G2 is focused to a short distance object, the position of the principal light ray passing through the second lens group G2 becomes more spaced apart from the optic axis and astigmatism is aggravated. Therefore, the present invention intends to correct the fluctuation of astigmatism by moving the third lens group G3 along the optic axis and varying the spacing between the third lens group G3 and the fourth lens group G4 with the movement of the second lens group G2. The spacing between the third lens group G3 and the fourth lens group G4 is a substantially parallel light beam system during the infinity in-focus, and by varying this spacing, it is possible to vary only astigmatism and coma without greatly fluctuating spherical aberration. The optimum condition for achieving good correction of astigmatism is the aforementioned formula.

Moving the third lens group G3 toward the image side is advantageous to increase the photographing magnification, but if this is done, the image side principal point of the entire lens system is moved toward the object side and the photographing distance when the magnification is made constant becomes great, and this is disadvantageous to effect macro-photography. Also, astigmatism greatly fluctuates in the negative direction and it becomes difficult to well correct the fluctuation caused by the second lens group G2. If, conversely, the third lens group G3 is moved toward the object side, the image side principal point of the entire lens system is moved toward the image side and the photographing distance for photographing at a predetermined magnification becomes small, but the photographing magnification is decreased. Also, in such case, astigmatism fluctuates in the positive direction and it becomes difficult to sufficiently correct the fluctuation caused by the second lens group G2. Accordingly, if the lower limit of the above-mentioned condition is departed from, it will become difficult to effect photography at a sufficiently short photographing distance and moreover, astigmatism will be increased in the negative direction and it will become impossible to maintain a good imaging performance. On the other hand, if the upper limit of said condition is exceeded, the amount of movement of the second lens group G2 will become great in order to gain the photographing magnification, and the first lens group G1 and the second lens group G2 will mechanically interfere with each other and thus, it will become difficult to increase the substantial photographing magnification. Moreover, astigmatism will be increased in the positive direction and it will become difficult to maintain a good imaging performance.

In the macro-photographic system of the zoom lens according to the present invention, it is possible to correct the sine condition by moving the first lens group G1 along the optic axis during macro-photography. That is, during the macro-photography by the movement of the second lens group G2 and the third lens group G3, it is possible to control the sine condition by moving the first lens group G1 at the same time and thereby well correct not only astigmatism but also coma during macro-photography.

Figure 2:
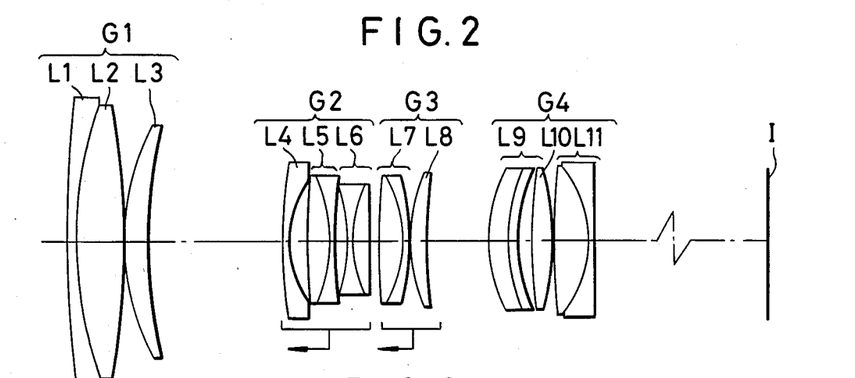
FIG. 2 shows the lens construction of a first embodiment of the present invention at the telephoto end thereof.

A first embodiment of the zoom lens capable of accomplishing macro-photography according to the present invention enables macro-photography to be accomplished by moving the second lens group G2 of negative refractive power toward the object side and also moving the third lens group G3 of positive refractive power toward the object side as shown in FIG. 2. FIG. 2 shows the lens construction of the first embodiment at the telephoto end. In FIG. 2, letter I designates the image plane. In the first embodiment, the first lens group G1 is comprised, in succession from the object side, of a negative meniscus lens L1 convex toward the object side, a positive lens L2 cemented to the lens L1, and a positive meniscus lens L3 convex toward the object side, and the second lens group G2 is comprised, in succession from the object side, of a negative meniscus lens L4 convex toward the object side, a meniscus lens L5 comprising a positive lens and a negative lens cemented together and convex toward the object side, and a meniscus lens L6 comprising a negative lens and a positive lens cemented together and concave toward the object side. The third lens group G3 is comprised, in succession from the object side, of a lens L7 comprising a positive lens and a negative meniscus lens concave toward the object side, and a positive meniscus lens L8 convex toward the object side, and the fourth lens group G4 is comprised, in succession from the object side, of a lens L9 comprising a positive meniscus lens convex toward the object side and a negative meniscus lens convex toward the object side cemented together, a positive lens L10, and a lens L11 comprising a positive lens and a negative meniscus lens concave toward the object side cemented together.

Figure 3:
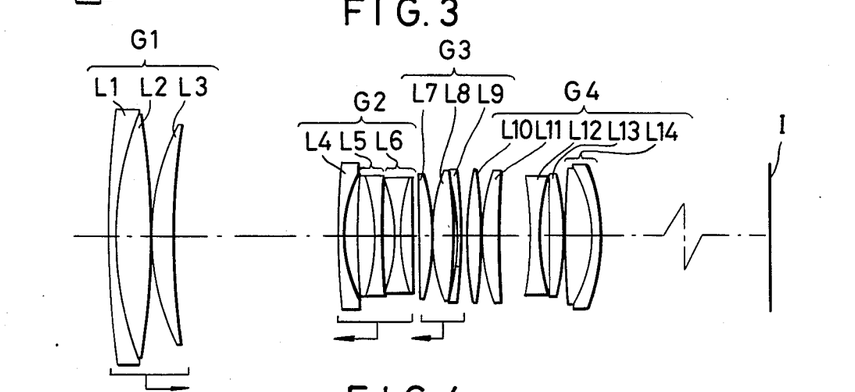
FIG. 3 shows the lens construction of a second embodiment of the present invention at the telephoto end thereof.

A second embodiment of the present invention, as shown in FIG. 3 which shows the lens construction at the telephoto end, enables macro-photography to be accomplished by moving the second lens group G2 toward the object side and also moving the third lens group G3 toward the object side and further moving the first lens group G1 toward the image side.

In the second embodiment, the first lens group G1 is similar in construction to the first lens group G1 of the first embodiment with the exception that the lenses L1 and L2 are cemented together, and the second lens group G2 is of the same construction as that of the first embodiment. The third lens group G3 is comprised, in succession from the object side, of a positive meniscus lens L7 concave toward the object side, a positive lens L8 and a negative meniscus lens L9 concave toward the object side, and the fourth lens group G4 is comprised, in succession from the object side, of a positive lens L10, a positive meniscus lens L11 convex toward the object side, a negative lens L12, a positive meniscus lens L13 concave toward the object side, and a lens L14 comprising a positive lens and a negative meniscus lens concave toward the object side cemented together.

Figure 4:
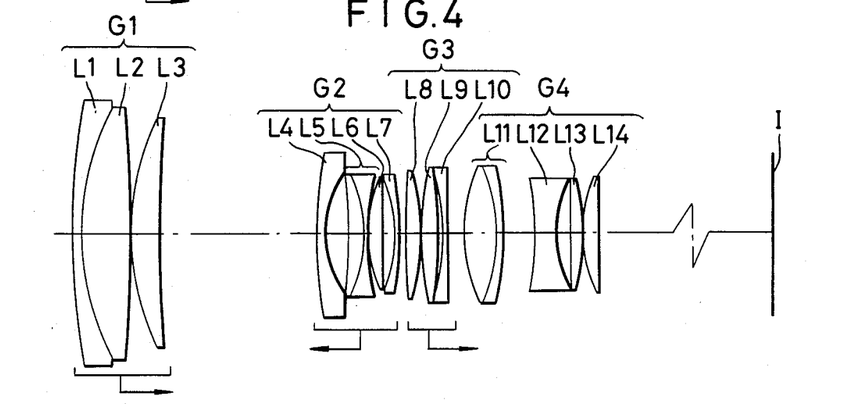
FIG. 4 shows the construction of a third embodiment of the present invention at the telephoto end thereof.

A third embodiment of the present invention, as shown in FIG. 4 which shows the lens construction at the telephoto end, enables macro-photography to be accomplished by moving the second lens group G2 toward the object side and moving the third lens group G3 toward the image side and further moving the first lens group G1 toward the image side.

In the third embodiment, the first lens group G1 is similar in construction to the first lens group G1 of the second embodiment, and the second lens group G2 is comprised, in succession from the object side, of a positive meniscus lens L4 convex toward the object side, a lens L5 comprising a positive meniscus lens concave toward the object side and a negative lens cemented together, a positive meniscus lens L6 convex toward the object side, and a negative meniscus lens L7 concave toward the object side. The third lens group G3 is comprised, in succession from the object side, of a positive lens L8, a positive lens L9 and a negative meniscus lens L10 concave toward the object side, and the fourth lens group G4 is comprised, in succession from the object side, of a lens L11 comprising a positive lens and a negative meniscus lens concave toward the object side cemented together, a negative lens L12, a negative lens L13 concave toward the object side, and a positive meniscus lens L14 convex toward the object side.

The numerical data of the respective embodiments are shown in Tables 1 to 3 below. In each table, the numbers at the left end represent the order from the object side. Also, the spacings between the lens groups at a maximum photographing magnification $\beta = -0.25$ are indicated in these tables. The refractive indices and Abbe numbers are the values for d-line ($\lambda = 587.6$ nm).

TABLE 1

(First embodiment)
Focal length: f = 35~135
F-number: 3.5~4.5

| No. | Radius of curvature r | Center thickness and spacing d | Refractive index n | Abbe number $\nu$ | |
|---|---|---|---|---|---|
| 1 | 205.20 | 1.40 | 1.80518 | 25.36 | $G_1$ |
| 2 | 61.29 | 0.20 | | | |
| 3 | 63.33 | 9.10 | 1.62041 | 60.29 | |
| 4 | −135.26 | 0.10 | | | |
| 5 | 37.68 | 4.40 | 1.62280 | 57.03 | |
| 6 | 81.61 | $d_6$ = variable | | | |
| 7 | 97.30 | 1.40 | 1.79668 | 45.52 | $G_2$ |
| 8 | 19.09 | 3.00 | | | |
| 9 | 143.43 | 4.50 | 1.80518 | 25.36 | |
| 10 | −21.80 | 1.00 | 1.79668 | 45.52 | |
| 11 | 114.33 | 2.10 | | | |
| 12 | −23.38 | 0.90 | 1.71300 | 53.97 | |
| 13 | 20.65 | 3.5 | 1.79631 | 40.98 | |
| 14 | −213.64 | $d_{14}$ = variable | | | |
| 15 | 178.32 | 4.50 | 1.51823 | 58.96 | $G_3$ |
| 16 | −20.24 | 0.14 | | | |
| 17 | −19.53 | 1.30 | 1.80518 | 25.36 | |
| 18 | −32.35 | 0.10 | | | |
| 19 | 31.39 | 3.00 | 1.50137 | 56.46 | |
| 20 | 76.83 | $d_{20}$ = variable | | | |
| 21 | 22.94 | 4.00 | 1.58913 | 61.18 | $G_4$ |
| 22 | 29.08 | 1.50 | 1.80454 | 39.59 | |
| 23 | 22.20 | 2.50 | | | |
| 24 | 69.44 | 4.50 | 1.56384 | 60.82 | |
| 25 | −50.24 | 0.20 | | | |
| 26 | 111.34 | 6.50 | 1.56384 | 60.82 | |
| 27 | −18.42 | 1.40 | 1.79668 | 45.52 | |
| 28 | −438.94 | | | | |

| | f = 36.16 | f = 130.95 | $\beta = -0.25$ |
|---|---|---|---|
| $d_6$ | 1.090 | 25.349 | 13.099 |
| $d_{14}$ | 17.426 | 1.469 | 10.449 |
| $d_{20}$ | 19.762 | 11.406 | 14.676 |

$X_2 = -12.25$
$X_3 = -3.27$
$X_3/X_2 = 0.267$

TABLE 2

(Second Embodiment)
Focal length: f = 35~200
F-number: 3.5~4.5

| No. | Radius of curvature r | Center thickness and spacing d | Refractive index n | Abbe number $\nu$ | |
|---|---|---|---|---|---|
| 1 | 158.96 | 1.50 | 1.80518 | 25.36 | $G_1$ |
| 2 | 64.18 | 8.00 | 1.49782 | 82.28 | |
| 3 | −138.79 | 0.10 | | | |
| 4 | 47.22 | 4.30 | 1.67003 | 47.05 | |
| 5 | 127.19 | $d_5$ = variable | | | |
| 6 | 133.06 | 1.30 | 1.90265 | 35.76 | $G_2$ |
| 7 | 23.64 | 2.90 | | | |
| 8 | 154.62 | 4.20 | 1.80518 | 25.36 | |
| 9 | −32.48 | 1.10 | 1.80411 | 46.43 | |
| 10 | 117.17 | 2.70 | | | |
| 11 | −25.41 | 1.00 | 1.71300 | 53.97 | |
| 12 | 30.77 | 2.80 | 1.86074 | 23.00 | |
| 13 | 483.93 | $d_{13}$ = variable | | | |
| 14 | −486.79 | 2.50 | 1.51680 | 64.12 | $G_3$ |
| 15 | −39.43 | 0.10 | | | |
| 16 | 36.24 | 4.50 | 1.51860 | 70.08 | |
| 17 | −84.69 | 0.80 | | | |
| 18 | −47.65 | 1.00 | 1.86074 | 23.00 | |
| 19 | −121.84 | $d_{19}$ = variable | | | |
| 20 | 72.48 | 3.00 | 1.51680 | 64.12 | $G_4$ |
| 21 | −115.65 | 0.10 | | | |
| 22 | 46.78 | 3.90 | 1.62041 | 60.29 | |
| 23 | 107.74 | 7.00 | | | |
| 24 | −89.69 | 2.00 | 1.79631 | 40.98 | |
| 25 | 37.59 | 2.50 | | | |
| 26 | −289.15 | 2.50 | 1.51680 | 64.12 | |
| 27 | −47.37 | 0.10 | | | |
| 28 | 93.53 | 6.50 | 1.51835 | 60.34 | |
| 29 | −24.61 | 1.30 | 1.78797 | 47.53 | |
| 30 | −43.43 | | | | |

| | f = 36.16 | f = 193.96 | $\beta = -0.25$ |
|---|---|---|---|
| $d_5$ | 1.266 | 35.760 | 11.260 |
| $d_{13}$ | 20.067 | 1.686 | 12.036 |
| $d_{19}$ | 17.344 | 1.231 | 7.881 |

$X_2 = -17.0$
$X_3 = -6.65$
$X_3/X_2 = 0.391$

TABLE 3

(Third Embodiment)
Focal length: f = 35~200
F-number: 3.5~4.5

| No. | Radius of curvature r | Center thickness and spacing d | Refractive index n | Abbe number $\nu$ | |
|---|---|---|---|---|---|
| 1 | 142.86 | 2.20 | 1.80518 | 25.43 | $G_1$ |
| 2 | 51.81 | 10.50 | 1.51680 | 64.12 | |
| 3 | −486.84 | 0.15 | | | |
| 4 | 54.37 | 6.20 | 1.77250 | 49.77 | |
| 5 | 379.70 | $d_5$ = variable | | | |
| 6 | 98.77 | 1.30 | 1.77250 | 49.77 | $G_2$ |
| 7 | 18.10 | 5.65 | | | |
| 8 | −74.41 | 3.10 | 1.80518 | 25.43 | |
| 9 | −23.75 | 1.10 | 1.77250 | 49.77 | |
| 10 | 58.48 | 0.10 | | | |
| 11 | 32.19 | 2.70 | 1.75000 | 25.14 | |
| 12 | 219.20 | 3.00 | | | |
| 13 | −25.10 | 1.10 | 1.61800 | 63.38 | |
| 14 | −55.94 | $d_{14}$ = variable | | | |
| 15 | 304.15 | 2.80 | 1.51680 | 64.12 | $G_3$ |
| 16 | −52.50 | 0.15 | | | |
| 17 | 48.14 | 4.80 | 1.51680 | 64.12 | |
| 18 | −44.60 | 0.50 | | | |
| 19 | −39.18 | 1.10 | 1.80518 | 25.43 | |
| 20 | −758.83 | $d_{20}$ = variable | | | |
| 21 | 29.51 | 7.00 | 1.60342 | 38.02 | $G_4$ |
| 22 | −33.05 | 1.20 | 1.85000 | 40.51 | |

TABLE 3-continued (Third Embodiment)
Focal length: f = 35~200
F-number: 3.5~4.5

| | | | | |
|---|---|---|---|---|
| 23 | −59.50 | 6.68 | | |
| 24 | −73.85 | 5.58 | 1.85026 | 32.24 |
| 25 | 24.04 | 2.35 | | |
| 26 | −189.79 | 2.50 | 1.51680 | 64.12 |
| 27 | −35.72 | 0.15 | | |
| 28 | 30.69 | 3.50 | 1.54072 | 47.22 |
| 29 | 472.93 | | | |

| | f = 36.16 | f = 195.09 | β = −0.25 |
|---|---|---|---|
| $d_5$ | 0.800 | 33.801 | 19.401 |
| $d_{14}$ | 26.423 | 1.000 | 16.360 |
| $d_{20}$ | 11.300 | 3.722 | 0.762 |

$$X_2 = -12.4$$
$$X_3 = 2.96$$
$$X_2/X_3 = -0.239$$

Figure 5A:
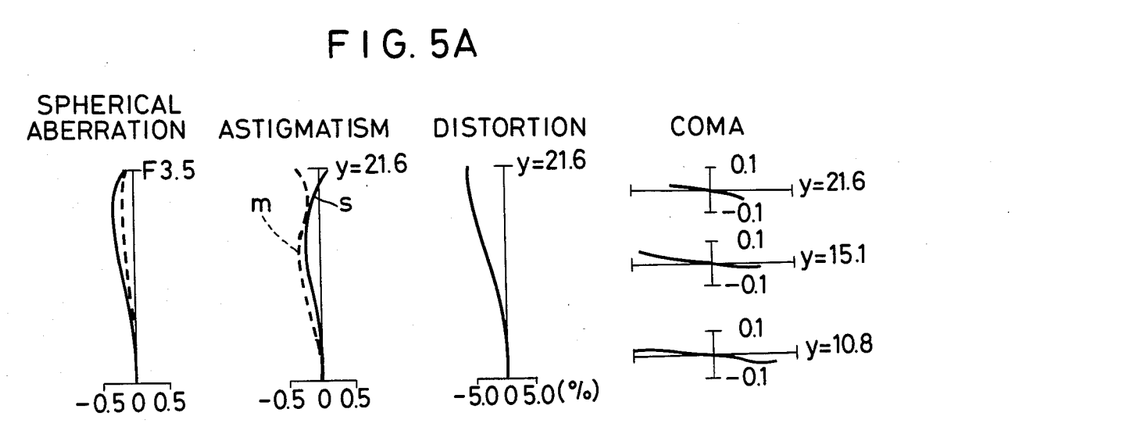
FIG. 5A shows the various aberrations at the wide angle end of the first embodiment.
Figure 5B:
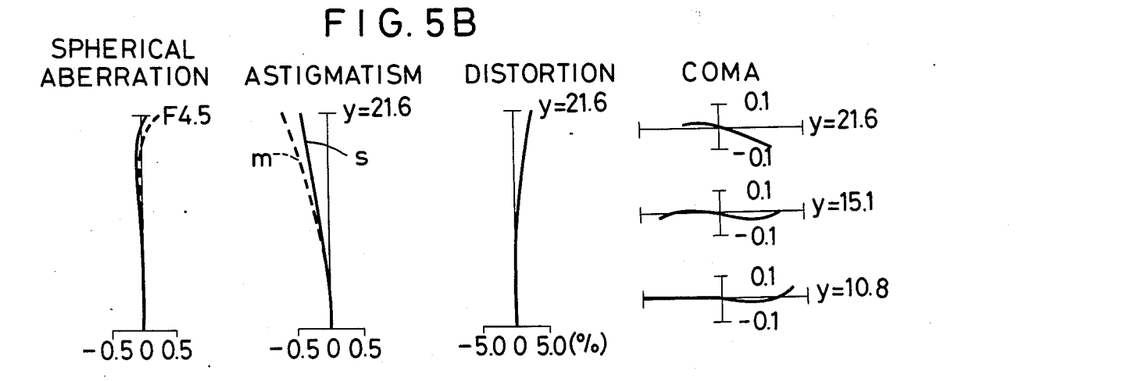
FIG. 5B shows the various aberrations at the telephoto end of the first embodiment.
Figure 5C:
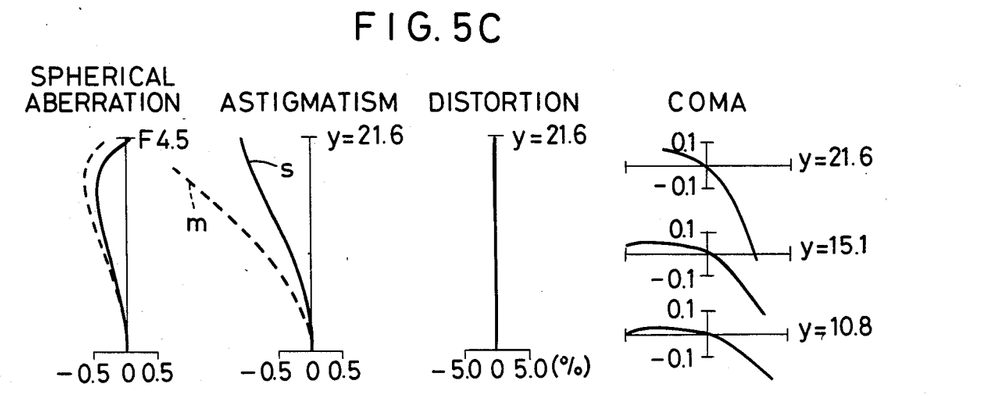
FIG. 5C shows the various aberrations for the comparison with the aberrations in the first embodiment during macro-photography.
Figure 5D:
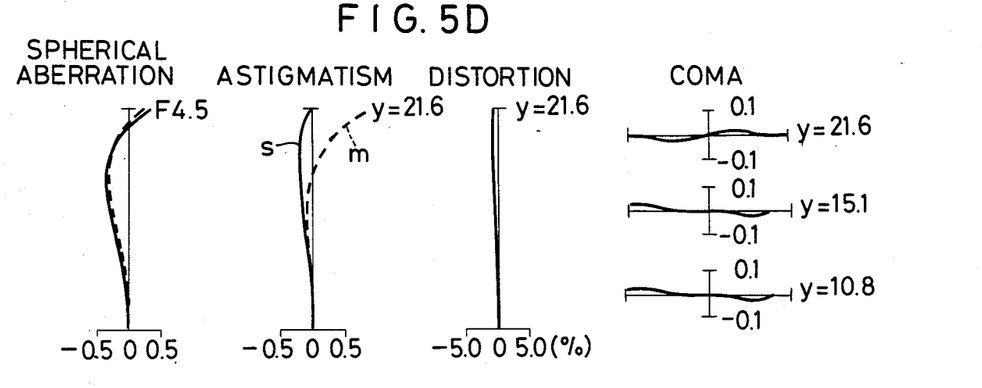
FIG. 5D shows the various aberrations in the first embodiment during macro-photography.

In order to show the improvement in the imaging performance of each of the above-described embodiments during macro-photography, a case where macro-photography has been effected by only the second lens group G2 will be shown as a comparative example. FIGS. 5A–5D show the various aberrations in the first embodiment. FIG. 5A shows the aberrations at the wide angle end, and FIG. 5B shows the aberrations at the telephoto end. FIG. 5C shows the aberrations when macro-photography has been effected by movement of only the second lens group G2, and more particularly the aberrations when macro-photography at a photographing distance Do=0.255 m and a photographing magnification β=−0.25 has been effected with the second lens group G2 moved by 8.37 mm toward the object side. FIG. 5D shows the aberrations when macro-photography at a photographing distance Do=0.288 m and a photographing magnification β=−0.25 has been effected by the macro-photography system according to the present invention with the second lens group G2 moved by 12.25 mm toward the object side and the third lens group G3 moved by 3.27 mm also toward the object side. From the comparison with the aberrations shown in FIG. 5C, it is apparent that in FIG. 5D, astigmatism is corrected very well and at the same time, coma is also corrected well.

Figure 6A:
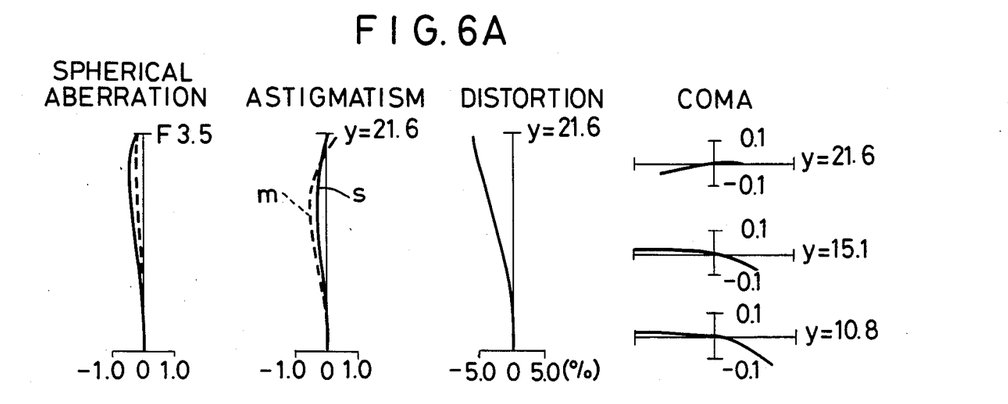
FIG. 6A shows the various aberrations at the wide angle end of the second embodiment.
Figure 6B:
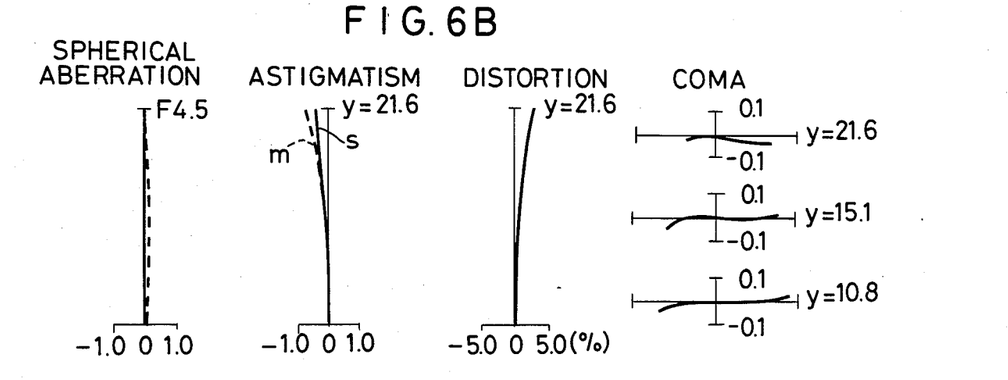
FIG. 6B shows the various aberrations at the telephoto end of the second embodiment.
Figure 6C:
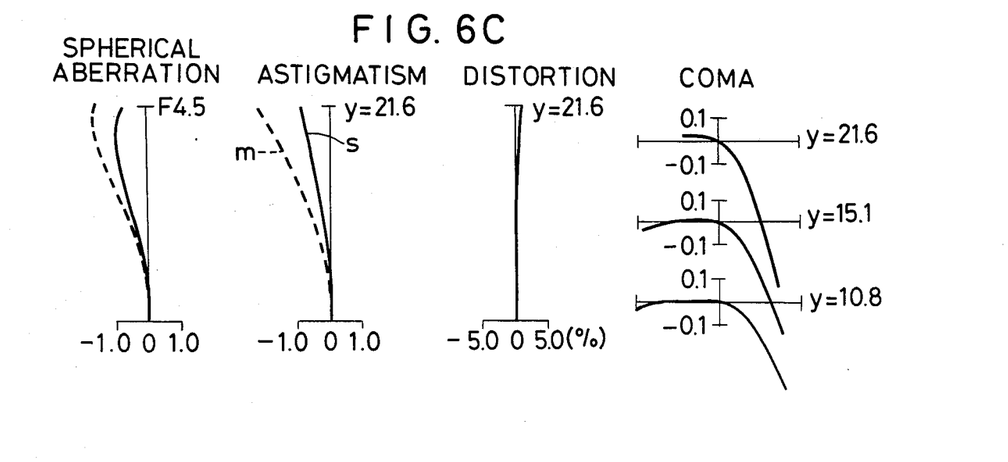
FIGS. 6C and 6D show the various aberrations for the comparison with the aberrations in the second embodiment during macro-photography.
Figure 6D:
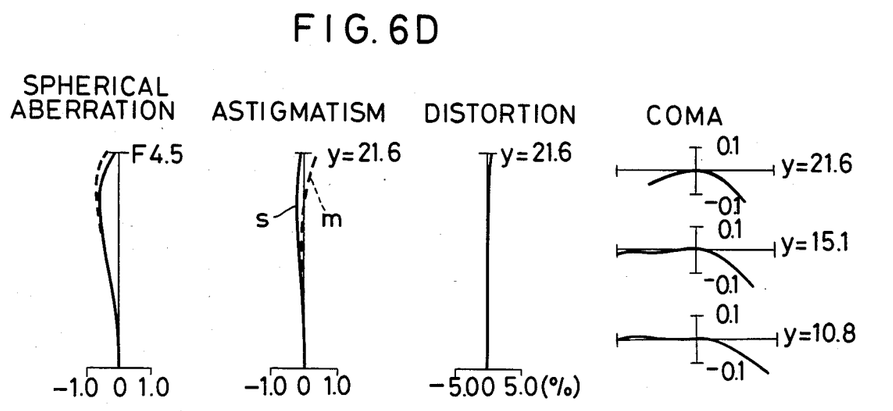
Figure 6E:
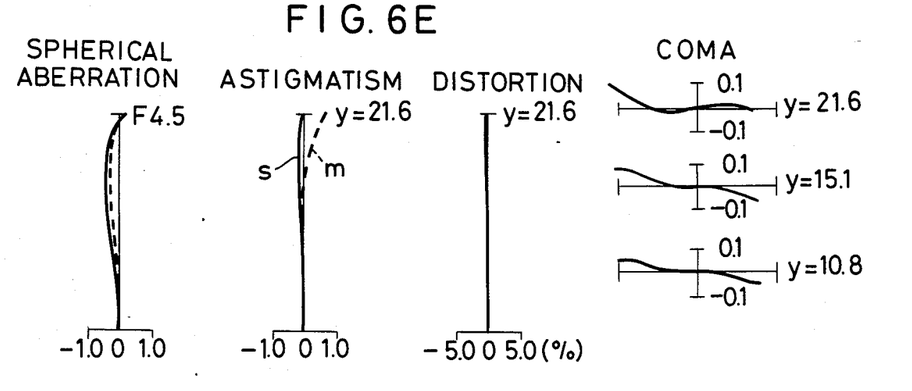
FIG. 6E shows the various aberrations in the second embodiment during macro-photography.

FIG. 6A shows the aberrations at the wide angle end, and FIG. 6B shows the aberrations at the telephoto end. FIG. 6C shows the aberrations when macro-photography has been effected by movement of only the second lens group G2, and more particularly the aberrations when macro-photography at a photographing distance Do=0.364 m and a photography magnification β=−0.25 has been effected with the second lens group G2 moved by 8.52 mm toward the object side. FIG. 6D shows the aberrations when macro-photography at a photographing distance Do=0.314 m and a photographing magnification β=−0.25 has been effected by the macro-photography system according to the present invention with the second lens group G2 moved by 13.0 mm toward the object side and the third lens group G3 moved by 3.78 mm also toward the object side. FIG. 6E shows the aberrations when macro-photography at a photographing distance Do=0.244 mm and a photographing magnification β=−0.25 has been effected with the second lens group G2 moved by 17.0 mm toward the object side, the third lens group G3 moved by 6.65 mm toward the object side and the first lens group G1 moved by 7.5 mm toward the image side. According to the comparison between these aberration graphs, it is apparent that astigmatism and coma occurring as shown in FIG. 6C in the case by the movement of only the second lens group G2 are corrected considerably well as shown in FIG. 6D by adding the movement of the third lens group G3 in accordance with the present invention. It is apparent that if the first lens group G1 is also moved at the same time, coma will be corrected better as shown in FIG. 6E.

Figure 7A:
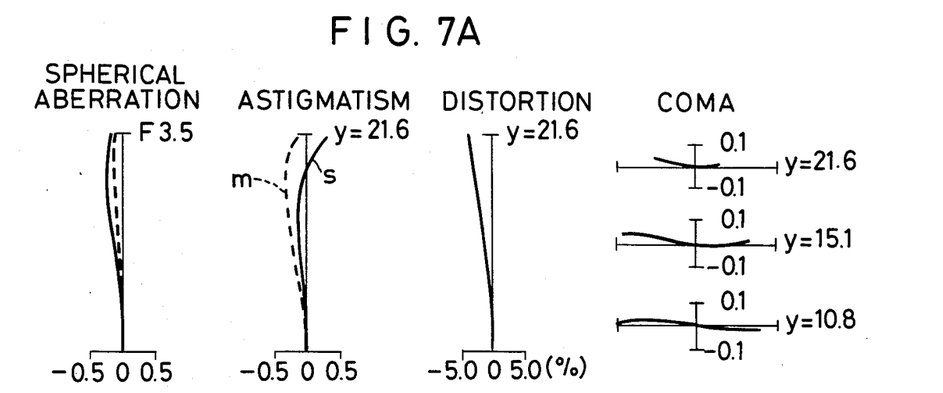
FIG. 7A shows the various aberrations at the wide angle end of the third embodiment.
Figure 7B:
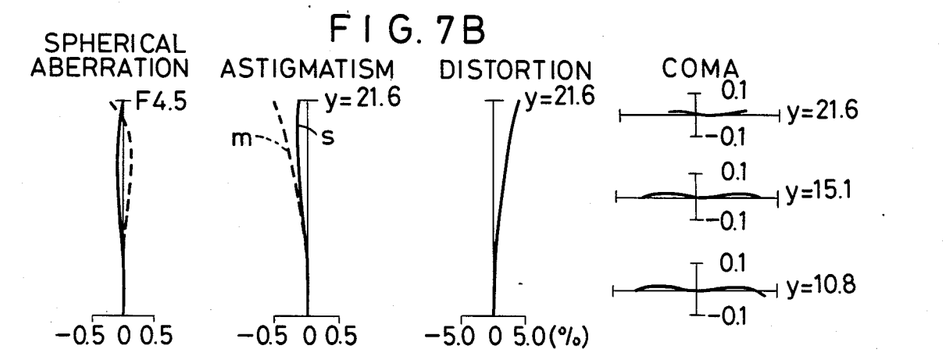
FIG. 7B shows the various aberrations at the telephoto end of the third embodiment.
Figure 7C:
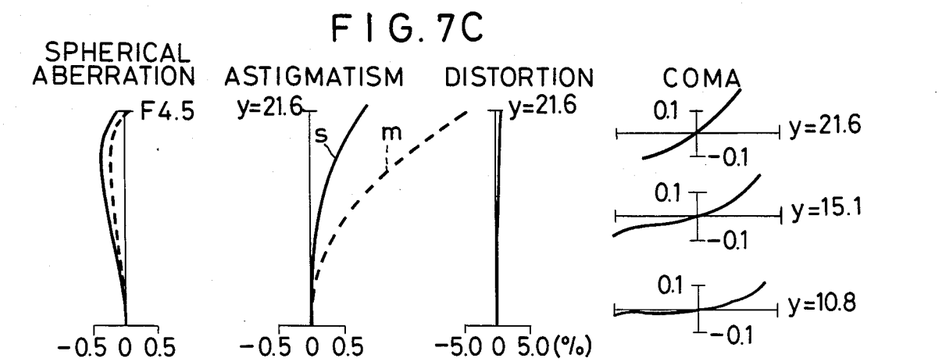
FIGS. 7C and 7D shows the various aberrations for the comparison with the aberrations in the third embodiment during macro-photography.
Figure 7D:
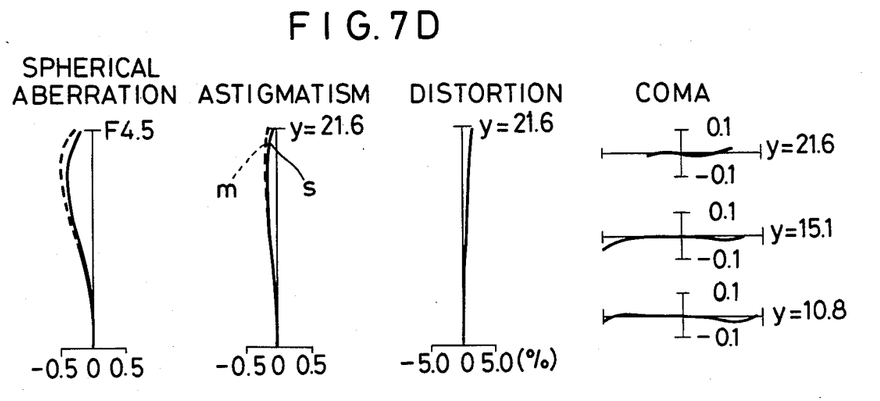
Figure 7E:
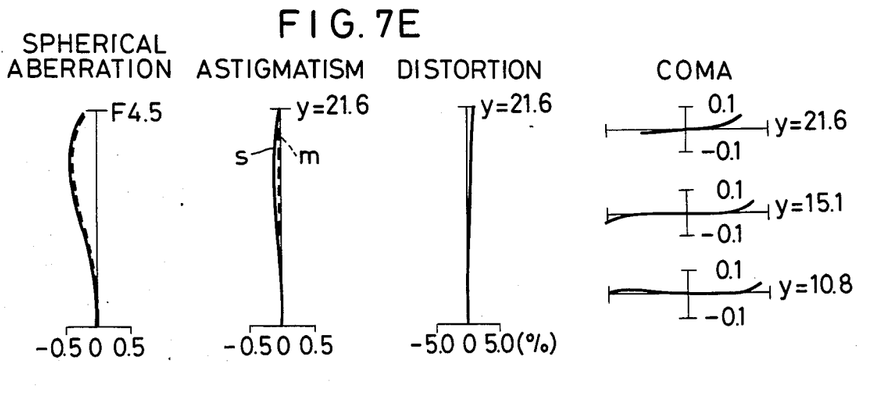
FIG. 7E shows the various aberrations in the third embodiment during macro-photography.

FIG. 7A shows the aberrations at the wide angle end, and FIG. 7B shows the aberrations at the telephoto end. FIG. 7C shows the aberrations when macro-photography has been effected by movement of only the second lens group G2, and more particularly the aberrations when macro-photography at a photographing distance Do=0.270 m and a photographing magnification β=−0.25 has been effected with the second lens group G2 moved by 15.37 mm toward the object side. FIG. 7D shows the aberrations when macro-photography at a photographing distance Do=0.316 m and a photographing magnification β=−0.25 has been effected by the macro-photography system according to the present invention with the second lens group G2 moved by 10.5 mm toward the object side and the third lens group G3 moved by 4.04 mm toward the image side. FIG. 7E shows the aberrations when macro-photography at a photographing distance Do=0.280 m and a photographing magnification β=−0.25 has been effected with the second lens group G2 moved by 12.4 mm toward the object side, the third lens group G3 moved by 2.96 mm toward the image side and further the first lens group G1 moved by 2.0 mm toward the image side. According to the comparison between these aberration graphs, it is apparent that astigmatism and coma substantially occurring as shown in FIG. 7C in the case by the movement of only the second lens group G2 are corrected considerably well as shown in FIG. 7D by adding the movement of the third lens group G3 in accordance with the present invention. It is apparent that if the first lens group G1 is also moved at the same time, coma will be corrected better as shown in FIG. 7E. The broken line in the spherical aberration graph of each aberration graph indicates the offence of the sine condition.

According to the present invention, as described above, there is achieved a zoom lens which is capable of photographing up to a very short photographing distance Do of 0.3 m or less and moreover in which astigmatism, coma, etc. are corrected well even during macro-photography and which can maintain an excellent imaging performance.

What we claim is:

1. A zoom lens capable of macrophotography and having, in succession from the object side, a first lens group of positive refractive power, a second lens group of negative refractive power, a third lens group of positive refractive power and a fourth lens group of positive refractive power, said first lens group, said third lens group and said fourth lens group being movable toward the object side for a magnification change from the wide angle end to the telephoto end, wherein the focusing up to a short distance object is made possible by moving said second lens group along the optic axis from the position of its telephoto end toward the object side and moving said third lens group along the optic axis from the position of its telephoto end and the following condition is satisfied:

$-0.5 < \chi_3/\chi_2 < 0.5$, where $\chi_2$ is the amount of movement of said second lens group from the telephoto end toward the object side for short distance focusing and $\chi_3$ is the amount of movement of said third lens group from the telephoto end toward the object side for short distance focusing.

2. A zoom lens according to claim 1, wherein said first lens group is moved along the optic axis during the movement of said second and third lens groups for the focusing to the short distance object.

3. A zoom lens according to claim 1, satisfying the following data:

Focal length: f = 35~135
F-number: 3.5~4.5

| No. | Radius of curvature r | Center thickness and spacing d | Refractive index n | Abbe number ν | |
|---|---|---|---|---|---|
| 1 | 205.20 | 1.40 | 1.80518 | 25.36 | $G_1$ |
| 2 | 61.29 | 0.20 | | | |
| 3 | 63.33 | 9.10 | 1.62041 | 60.29 | |
| 4 | −135.26 | 0.10 | | | |
| 5 | 37.68 | 4.40 | 1.62280 | 57.03 | |
| 6 | 81.61 | $d_6 =$ variable | | | |
| 7 | 97.30 | 1.40 | 1.79668 | 45.52 | $G_2$ |
| 8 | 19.09 | 3.00 | | | |
| 9 | 143.43 | 4.50 | 1.80518 | 25.36 | |
| 10 | −21.80 | 1.00 | 1.79668 | 45.52 | |
| 11 | 114.33 | 2.10 | | | |
| 12 | −23.38 | 0.90 | 1.71300 | 53.97 | |
| 13 | 20.65 | 3.5 | 1.79631 | 40.98 | |
| 14 | −213.64 | $d_{14} =$ variable | | | |
| 15 | 178.32 | 4.50 | 1.51823 | 58.96 | $G_3$ |
| 16 | −20.24 | 0.14 | | | |
| 17 | −19.53 | 1.30 | 1.80518 | 25.36 | |
| 18 | −32.35 | 0.10 | | | |
| 19 | 31.39 | 3.00 | 1.50137 | 56.46 | |
| 20 | 76.83 | $d_{20} =$ variable | | | |
| 21 | 22.94 | 4.00 | 1.58913 | 61.18 | $G_4$ |
| 22 | 29.08 | 1.50 | 1.80454 | 39.59 | |
| 23 | 22.20 | 2.50 | | | |
| 24 | 69.44 | 4.50 | 1.56384 | 60.82 | |
| 25 | −50.24 | 0.20 | | | |
| 26 | 111.34 | 6.50 | 1.56384 | 60.82 | |
| 27 | −18.42 | 1.40 | 1.79668 | 45.52 | |
| 28 | −438.94 | | | | |

| | f = 36.16 | f = 130.95 | β = −0.25 |
|---|---|---|---|
| $d_6$ | 1.090 | 25.349 | 13.099 |
| $d_{14}$ | 17.426 | 1.469 | 10.449 |
| $d_{20}$ | 19.762 | 11.406 | 14.676 |

$X_2 = -12.25$
$X_3 = -3.27$
$X_3/X_2 = 0.267$

4. A zoom lens according to claim 1, satisfying the following data:

Focal length: f = 35~200
F-number: 3.5~4.5

| No. | Radius of curvature r | Center thickness and spacing d | Refractive index n | Abbe number ν | |
|---|---|---|---|---|---|
| 1 | 158.96 | 1.50 | 1.80518 | 25.36 | $G_1$ |
| 2 | 64.18 | 8.00 | 1.49782 | 82.28 | |
| 3 | −138.79 | 0.10 | | | |
| 4 | 47.22 | 4.30 | 1.67003 | 47.05 | |
| 5 | 127.19 | $d_5 =$ variable | | | |
| 6 | 133.06 | 1.30 | 1.90265 | 35.76 | $G_2$ |
| 7 | 23.64 | 2.90 | | | |
| 8 | 154.62 | 4.20 | 1.80518 | 25.36 | |
| 9 | −32.48 | 1.10 | 1.80411 | 46.43 | |
| 10 | 117.17 | 2.70 | | | |
| 11 | −25.41 | 1.00 | 1.71300 | 53.97 | |
| 12 | 30.77 | 2.80 | 1.86074 | 23.00 | |
| 13 | 483.93 | $d_{13} =$ variable | | | |
| 14 | −486.79 | 2.50 | 1.51680 | 64.12 | $G_3$ |
| 15 | −39.43 | 0.10 | | | |
| 16 | 36.24 | 4.50 | 1.51860 | 70.08 | |
| 17 | −84.69 | 0.80 | | | |
| 18 | −47.65 | 1.00 | 1.86074 | 23.00 | |
| 19 | −121.84 | $d_{19} =$ variable | | | |
| 20 | 72.48 | 3.00 | 1.51680 | 64.12 | $G_4$ |
| 21 | −115.65 | 0.10 | | | |
| 22 | 46.78 | 3.90 | 1.62041 | 60.29 | |
| 23 | 107.74 | 7.00 | | | |
| 24 | −89.69 | 2.00 | 1.79631 | 40.98 | |
| 25 | 37.59 | 2.50 | | | |
| 26 | −289.15 | 2.50 | 1.51680 | 64.12 | |
| 27 | −47.37 | 0.10 | | | |
| 28 | 93.53 | 6.50 | 1.51835 | 60.34 | |
| 29 | −24.61 | 1.30 | 1.78797 | 47.53 | |
| 30 | −43.43 | | | | |

| | f = 36.16 | f = 193.96 | β = −0.25 |
|---|---|---|---|
| $d_5$ | 1.266 | 35.760 | 11.260 |
| $d_{13}$ | 20.067 | 1.686 | 12.036 |
| $d_{19}$ | 17.344 | 1.231 | 7.881 |

$X_2 = -17.0$
$X_3 = -6.65$
$X_3/X_2 = 0.391$

5. A zoom lens according to claim 1, satisfying the following data:

Focal length: F = 35~200
F-number: 3.5~4.5

| No. | Radius of curvature r | Center thickness and spacing d | Refractive index n | Abbe number ν | |
|---|---|---|---|---|---|
| 1 | 142.86 | 2.20 | 1.80518 | 25.43 | $G_1$ |
| 2 | 51.81 | 10.50 | 1.51680 | 64.12 | |
| 3 | −486.84 | 0.15 | | | |
| 4 | 54.37 | 6.20 | 1.77250 | 49.77 | |
| 5 | 379.70 | $d_5 =$ variable | | | |
| 6 | 98.77 | 1.30 | 1.77250 | 49.77 | $G_2$ |
| 7 | 18.10 | 5.65 | | | |
| 8 | 74.41 | 3.10 | 1.80518 | 25.43 | |
| 9 | −23.75 | 1.10 | 1.77250 | 49.77 | |
| 10 | 58.48 | 0.10 | | | |
| 11 | 32.19 | 2.70 | 1.75000 | 25.14 | |
| 12 | 219.20 | 3.00 | | | |
| 13 | −25.10 | 1.10 | 1.61800 | 63.38 | |
| 14 | −55.94 | $d_{14} =$ variable | | | |
| 15 | 304.15 | 2.80 | 1.51680 | 64.12 | $G_3$ |
| 16 | −52.50 | 0.15 | | | |
| 17 | 48.14 | 4.80 | 1.51680 | 64.12 | |
| 18 | −44.60 | 0.50 | | | |
| 19 | −39.18 | 1.10 | 1.80518 | 25.43 | |
| 20 | −758.83 | $d_{20} =$ variable | | | |
| 21 | 29.51 | 7.00 | 1.60342 | 38.02 | $G_4$ |
| 22 | −33.05 | 1.20 | 1.85000 | 40.51 | |
| 23 | −59.50 | 6.68 | | | |
| 24 | −73.85 | 5.58 | 1.85026 | 32.24 | |
| 25 | 24.04 | 2.35 | | | |

-continued

Focal length: F = 35~200
F-number: 3.5~4.5

| 26 | −189.79 | 2.50 | 1.51680 | 64.12 |
| 27 | −35.72 | 0.15 | | |
| 28 | 30.69 | 3.50 | 1.54072 | 47.22 |
| 29 | 472.93 | | | |

| | f = 36.16 | f = 195.09 | β = −0.25 |
| --- | --- | --- | --- |
| $d_5$ | 0.800 | 33.801 | 19.401 |
| $d_{14}$ | 26.423 | 1.000 | 16.360 |
| $d_{20}$ | 11.300 | 3.722 | 0.762 |

-continued

Focal length: F = 35~200
F-number: 3.5~4.5

$X_2 = -12.4$
$X_3 = 2.96$
$X_2/X_3 = -0.239$

6. A zoom lens according to claim 1, wherein said third lens group is moved toward the object side for the focusing to the short distance object.

7. A zoom lens according to claim 6, wherein said first lens group is moved along the optic axis during the movement of said second and third lens groups for the focusing to the short distance object.

* * * * *